United States Patent [19]

Roberts

[11] Patent Number: 5,014,528
[45] Date of Patent: May 14, 1991

[54] TAMPER-PROOF LOCKING MECHANISM FOR QUARTER TURN VALVES

[75] Inventor: John L. Roberts, West Milwaukee, Wis.

[73] Assignee: Milwaukee Valve Company, Inc., Milwaukee, Wis.

[21] Appl. No.: 573,491

[22] Filed: Aug. 27, 1990

[51] Int. Cl.$^5$ ............................................. F16K 35/06
[52] U.S. Cl. ....................................... 70/177; 70/180; 70/203; 70/212; 137/385; 251/104; 251/110; 251/288; 292/207
[58] Field of Search ................................ 70/175-177, 70/180, 183, 187, 202, 203, 210-212; 137/385; 251/104, 105, 110, 288; 292/106, 207

[56] References Cited

U.S. PATENT DOCUMENTS

| 219,441 | 9/1879 | Bryan et al. | 70/180 |
| 1,099,077 | 6/1914 | Wray | 70/180 |
| 1,193,737 | 8/1916 | Thomas | 70/212 |
| 1,363,225 | 12/1920 | Boggs | 70/180 |
| 1,714,856 | 5/1929 | Douglas | 70/212 |
| 2,267,704 | 12/1941 | Abel | 292/207 X |
| 2,996,323 | 8/1961 | Wood | 292/207 |
| 3,401,715 | 9/1968 | Johnson et al. | 137/385 |
| 3,960,168 | 6/1976 | Plympton | 137/385 |
| 4,126,023 | 11/1978 | Smith et al. | 70/177 |
| 4,162,690 | 7/1979 | Anderson | 137/385 |

FOREIGN PATENT DOCUMENTS 124909  5/1949  Sweden ............................ 292/106

Primary Examiner—Lloyd A. Gall
Attorney, Agent, or Firm—Michael, Best & Friedrich

[57] ABSTRACT

A tamper-proof locking mechanism for a rotatable control device, such as a quarter turn valve including a valve member connected to a stem journalled in a body housing the valve member and an operating handle connected to the stem for rotating the valve member between open and closed positions. The locking mechanism includes a pair of lugs on the valve body at circumferentially spaced locations corresponding to the locations of an intermediate portion of the handle when the valve member is in the open and closed positions. A slider member is slidably mounted on the intermediate portion of the handle for reciprocative movement between a locked position and an unlocked position. The slider member includes a latch element having an open portion for receiving the lugs and arranged to restrain both rotational and axial movement of the handle when the handle is in the open or closed position and the slider member is in the locked position. When the slider member is moved to the unlocked position, the handle can be moved freely between the open and closed positions. An aperture in the intermediate portion of the handle adjacent the slider member can receive the shackle of a padlock which is engaged by the slider member when movement of the slider member from the locked position is attempted.

16 Claims, 1 Drawing Sheet

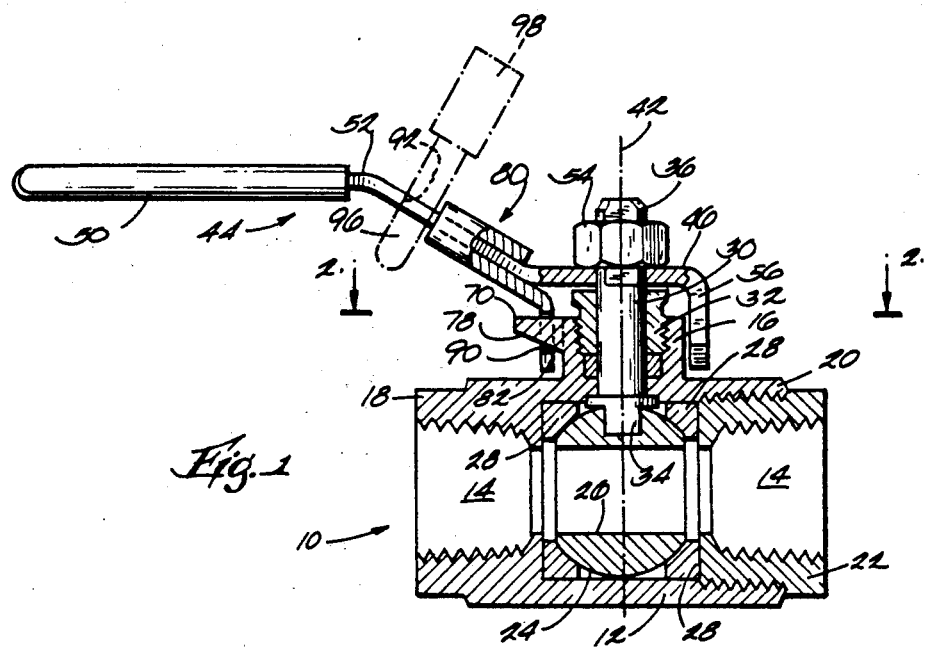
Fig. 1
Fig. 2
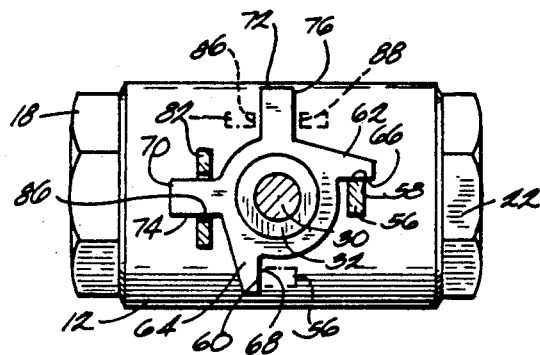
Fig. 3

TAMPER-PROOF LOCKING MECHANISM FOR QUARTER TURN VALVES

BACKGROUND OF THE INVENTION

This invention relates to tamper-proof locking mechanisms for controls having a rotatable control shaft projecting outwardly from a body housing a control means. In one aspect, the invention relates to tamper-proof mechanisms for locking quarter turn valves, such as ball valves, butterfly valves and plug valves, in a fully open and/or a fully closed position.

In some fluid operations, it is essential that certain manually-operated control valves be maintained in either the full open or closed position during normal operation. For example, Occupational Safety and Health Administration regulations require that certain control valves in hydraulic and pneumatic systems to be positively locked in the open or closed position. Another example is fire protection sprinkler systems where the control valves must be fully open at all times to insure proper water flow in the event of an emergency.

When such valves are located in areas where there is a risk of intentional tampering or where they may be unintentionally closed, opened or otherwise mispositioned, a locking mechanism which reliably and positively locks the operating handle in a selected position is required. To be completely effective, the locking mechanism must not only prevent rotational movement of the operating handle, but also prevent the operating handle from being lifted off the stem, even though a nut or the like holding the handle on the valve stem has been removed.

U.S. Pat. No. 4,126,023 discloses a locking and latching mechanism for quarter turn valves including a slider slidably mounted on an operating handle which is connected to a stem rotatably journalled in a boss on the valve body. The handle is rotated to move a valve member between open and closed positions. The slider includes a tang which is received in undercuts in the boss at locations corresponding to the open and closed positions. These undercuts are designed to be engaged by the tang, when the slider is in a locked position, to prevent rotational movement of the handle from the open or closed position and prevent the handle from being lifted off the stem. The intricate geometry of the valve body resulting from these undercuts causes a significant increase in the cost of molds, particularly molds for investment casting. Also, a build up of the maximum manufacturing tolerances in forming the valve body and stamping or otherwise forming the operating handle and slider can produce a situation where the slider tang can be wiggled out from beneath the undercuts.

SUMMARY OF THE INVENTION

One of the principal objects of the invention is to provide a simply constructed locking mechanism for rotatable control devices, such as quarter turn valves, for positively locking an operating handle connected to a rotatable control means, such as a valve member, in a selected position against unauthorized tampering.

Another principal object of the invention is to provide such a locking mechanism which permits molds used for forming a body housing the control means to have a relatively simplified design.

Another principal object of the invention is to provide such a locking mechanism which can accommodate a build up of maximum manufacturing tolerances and still reliably prevent unauthorized rotational or axial movement of the operating handle.

Other objects, aspects and advantages of the invention will become apparent to those skilled in the art upon reviewing the following detailed description, the drawing and appended claims.

The invention provides a tamper-proof locking mechanism for rotatable control devices including a body housing a control means, a control shaft journalled in an external boss on the body for rotation about an axis and connected to the control means, an operating handle having an inner end portion connected to an external portion of the control shaft, a gripping end portion for rotating the control means between first and second positions and an intermediate portion, and stop means on the body disposed in the rotational path of the handle inner end portion at locations corresponding to the first and second positions and engageable by the handle inner end portion to limit rotational movement of the control means between the first and second positions. The locking mechanism includes a pair of circumferentially-spaced lugs on the boss at locations corresponding to the locations of the intermediate portion of the handle when it is in the first and second positions, each lug having a side surface and a bottom surface, a slider member slidably mounted on the intermediate portion of the handle for reciprocative movement between locked and unlocked positions and a latch element connected to the slider member and having an open portion for receiving the respective one of the lugs when the handle is in the first or second position and the slider is in the locked position and which is spaced from the lugs when the slider member is in the unlocked position. The open portion of the latch element has laterally spaced side walls for engaging the side surfaces of the lugs to restrain rotational movement of the handle when the slider member is in the locked position and a bottom wall for engaging the bottom surface of the lugs to restrain axial movement of the handle relative to the control shaft when the slider member is in the locked position.

Means for preventing the slider member from being moved from the locked position can be provided. In a preferred embodiment, such means includes an aperture in the intermediate portion of the handle adjacent the slider member when it is in the locked position for receiving a locking member, such as a shackle of a padlock, which is engaged by the slider member when movement thereof from the locked position is attempted.

The locking mechanism provided by the invention is particularly adaptable for use on quarter turn valves for fluid systems, such as ball valves, butterfly valves and plug valves.

BRIEF DESCRIPTION OF THE DRAWINGS

FIG. 1 is a partially sectioned, elevational view of a ball valve embodying the invention, shown with the valve in the open position the slider member in the locked position.

FIG. 2 is a sectional view taken generally along line 2—2 in FIG. 1.

FIG. 3 is an enlarged, exploded, partially broken away, perspective view of the operating handle, slider member and the outer end portion of the stem of the ball valve illustrated in FIG. 1.

DESCRIPTION OF THE PREFERRED EMBODIMENT

Locking mechanisms embodying the invention can be adapted for a wide variety of controls including a rotatable control shaft carrying a control means and a manually operated handle connected to the control shaft for rotational movement of the control means, such as rheostats, potentiometers, variable capacitors, control cable operators and the like. It is particularly adaptable for manually-operated, quarter turn valves, such as ball valves, butterfly valves and plug valves, and will be described in connection with a ball valve.

Illustrated in the drawing is a ball valve 10 including a body 12 defining an internal flow passage 14 extending therethrough and an external boss 16. One end 18 of the body 12 is internally threaded for connection in a piping system and the opposite end 20 is internally threaded and receives an adapter section 22 which is internally threaded for connection in a piping system. Disposed inside the body 12 is a rotatable valve member consisting of a ball 24 having a central opening 26. The ball 24 is mounted on valve seats 28 for rotational movement between an open position wherein the opening 26 is aligned with the flow passage 14 as illustrated in FIG. 1 and a closed position wherein the opening 26 is rotated 90° to the position illustrated in FIG. 1 and the ball 24 blocks flow through the passage 14.

A stem 30 is journalled in the boss 16 via a bearing sleeve 32 threaded into the boss 16. The stem 30 has an internal end portion 34 connected to the ball 24 and an external end portion 36 which projects outwardly from the boss 16. The terminal part of the external outer end portion 36 is threaded and has opposed flat surfaces 38 and 40 (FIG. 3). The ball 24 is rotated back and forth, about the stem axis 42, between the fully open and closed positions by a manually-operated handle 44 including an inner end portion 46 having a slot 48 for receiving the external end portion 36 of the stem 30, a grip end portion 50 and an intermediate portion 52. The handle 44 is held on the stem 30 by a nut 54 threaded onto the external end portion 36 of the stem 30.

The valve 10 includes stop means for limiting rotation of the ball 24 to a quarter turn or 90° between the fully open and closed position. In the specific embodiment illustrated, the stop means comprises an inturned finger 56 on the inner end portion 46 of the handle 44 having opposed edges 58 and 60 and a pair of projections 62 and 64 on the boss 16 and circumferentially spaced relative to the stem axis 42 (FIG. 2). The projections 62 and 64 have generally flat surfaces 66 and 68, respectively. The surfaces 66 and 68 are located in the rotational path of the finger 56 and are engaged by the finger edges 58 and 60 when the ball 24 has been rotated to the fully open position and the fully closed position, respectively.

The locking mechanism of the invention is arranged to prevent the handle 44 from being moved from the fully open or from the fully closed position and also to prevent the handle 44 from being lifted off the external end portion 36 of the stem 32, even though the nut 54 has been removed.

The locking mechanism includes a pair of lugs 70 and 72 on the boss 66 and spaced circumferentially relative to the stem axis 42. The lugs 70 and 72 extend radially outwardly relative to the stem axis 42 and are at locations corresponding to the location of the intermediate portion 52 of the handle 44 when the ball 24 is in the fully open position and the fully closed position, respectively. Each lug 70 and 72 has a generally flat side surface 74 and 76, respectively, and a bottom surface 78.

The locking mechanism also includes a slider member 80 enveloping and slidably mounted on the intermediate portion 52 of the handle 44 for reciprocative movement between a locked position illustrated by solid lines in FIGS. 1 and 3 and an unlocked position illustrated by dashed lines in FIG. 3. Connected to the slider member 80 is a latch element 82 which extends inwardly toward the body 12. In the embodiment illustrated, the latch element 82 is formed as an integral part of the slider member 80 and extends generally parallel to the stem axis 42.

The latch element 82 includes an opening 84 which receives the lug 70 when the handle 44 is in the open position and the slider member 80 is in the locked position (Position A illustrated by solid lines in FIG. 2) and receives the lug 72 when the handle 44 is in the closed position and the slider member is in the locked position (Position B illustrated by dashed lines in FIG. 2). The latch element opening 84 has laterally spaced side walls 86 and 88 and a bottom wall 90. When the handle 44 and the slider member 80 are in Position A and an attempt is made to close the valve 10, the side wall 86 of the latch element opening 84 engages the surface 74 on the lug 70 to prevent appreciable movement of the handle in the closing direction. When the handle 44 and the slider member 80 are in Position B and an attempt is made to open the valve, the side wall 88 of the latch element opening 84 engages the surface 76 on the lug 72 to prevent appreciable movement of the handle 44 in the opening direction. When the handle 44 and the slider member 80 are in either Position A or Position B and an attempt is made to lift the handle 44 off the external end portion 36 of the stem 30 (after the nut 54 has been removed), the bottom wall 90 of the latch element opening 84 engages the bottom surface 78 of the respective lug 70 and 72 to prevent appreciable outward axial movement of the handle 44 relative to stem 30. When the slider member 80 is slipped to the unlocked position, the latch element 82 is spaced away from lugs 70 and 72 and the handle 44 can be freely rotated between the open and closed positions.

In the specific embodiment illustrated, the intermediate portion 52 of the handle 44 is inclined outwardly relative to the body 14 in a direction away from the boss 16 (i.e., extends at an acute angle to the stem axis 42). With this arrangement, the slider member 80 is more or less biased by gravity toward the locked position when the valve is oriented so that the stem axis 42 is generally perpendicular to the ground.

The locking mechanism preferably includes means for positively locking the slider member 80 in the locked position until it is desired to change the valve position. While various suitable arrangements can be used for this purpose, in the specific embodiment illustrated, the intermediate portion 52 of the handle 44 includes an aperture 92 located adjacent the outer edge 94 of the slider member 80 when it is in the locked position. The aperture 92 is sized to receive a pin or the like which is locked in place. For example, it can be sized to receive the shackle 96 of a padlock 98 as illustrated in FIG. 1.

The projections 62 and 64 and the lugs 70 and 7 preferably are formed as an integral part of the boss 16 when the body 12 is molded or cast. Because of the simplified configuration of the lugs 70 and 72, the side surfaces 74 and the bottom surface 78 can be held to relatively large (or wide) manufacturing tolerances. The bottom surface 78 of the lugs 70 and 72 preferably is tapered to facilitate movement of the slider member 80 to and from the locked position. The slider member 80 can be a stamped part and the simple arrangement of the latch element opening 84 (i.e., can be rectangular as illustrated) facilitates maintaining relatively large (or wide) manufacturing tolerances.

From the foregoing description, one skilled in the art can easily ascertain the essential characteristics of the invention and, without departing from the spirit and scope thereof, make various changes and modifications to adapt it to various usages.

What is claimed is:

1. A rotatable control device including
a body housing a control means and having an external boss;
a control shaft journalled in said boss for rotation about an axis and having an internal portion connected to said control means and an external portion extending outwardly from said boss;
an operating handle having an inner end portion connected to the external portion of said control shaft, a gripping end portion for rotating said control means between first and second positions and an intermediate portion;
stop means on said body disposed in the rotational path of the inner end of said handle at locations corresponding to said first and second positions and engageable by the inner end portion of said handle to limit rotational movement of said control means between said first and second positions;
a pair of circumferentially-spaced lugs on said boss extending radially outwardly relative to said axis at locations corresponding to the locations of the intermediate portion of said handle when said control means is in the first and second positions, each of said lugs having opposed side surfaces and a bottom surface;
a slider member slidably mounted on the intermediate portion of said handle for reciprocative movement between locked and unlocked positions; and
a latch element connected to said slider member and extending inwardly toward said body, said latch element having an open portion for receiving the corresponding one of said lugs when said handle is in the first or second position and said slider is in said locked position and which is spaced from said lugs when said slider member is in the unlocked position, said open portion having laterally spaced side walls for engaging the side surfaces of said lugs to restrain rotational movement of said handle when said slider member is in the locked position and a bottom wall for engaging the bottom surface of said lugs to restrain axial movement of said handle relative to said control shaft when said slider member is in the locked position.

2. A control device according to claim 1 including locking means for preventing said slider member from being moved from said locked position.

3. A control device according to claim 2 wherein said locking means includes
the intermediate portion of said handle having an aperture located adjacent said slider member when said slider member is in said locked position for receiving a locking member which is engaged by said slider member when movement of said slider member from the locked position is attempted.

4. A control device according to claim 3 wherein said aperture is sized to receive the shackle of a padlock which serves as said locking member.

5. A control device according to claim 1 wherein the immediate portion of said handle is inclined outwardly relative to said body in a direction away from said boss.

6. A control device according to claim 1 wherein
the inner end portion of said handle has a finger extending inwardly toward said body; and
said stop means comprises circumferentially spaced projections formed as an integral part of said boss and having surfaces at locations corresponding to said first and second positions which are engaged by said finger to limit rotational movement of said handle.

7. A control device according to claim 6 wherein said lugs are formed as an integral part of said boss.

8. A valve comprising
a body having a flow passage extending therethrough and an external boss;
a valve member disposed in said flow passage;
a stem journalled in said boss for rotation about an axis and having an inner end portion connected to said valve member and an outer end portion extending outwardly from said boss;
an operating handle for rotating said valve member between fully open and fully closed positions and having an inner end portion connected to the outer end portion of said stem, a grip end portion and an intermediate portion;
stop means on said body disposed in the rotational path of the inner end portion of said handle to limit motion of said valve member between open and closed positions;
a pair of circumferentially spaced lugs on said boss and extending radially outwardly relative to said axis at locations corresponding to the positions of the intermediate portion of said handle when said valve member is in said open and closed positions, each of said lugs having side surfaces and a bottom surface;
a slider member mounted on the intermediate portion of said handle for reciprocative movement between locked and unlocked positions; and
a latch element connected to said slider member extending inwardly toward said body, said latch element having an open portion for receiving the corresponding one of said lugs when said handle is in said open and closed positions and said slider member is said locked position and which is spaced away from said lugs when said slider member is in said unlocked position, said open portion having laterally spaced side walls for engaging the side surfaces of said lugs to restrain rotational movement of said handle when said slider member is in said locked position and a bottom wall for engaging the bottom surface of said lugs to restrain axial movement of said handle relative to said stem when said slider member is in said locked position.

9. A valve according to claim 8 including locking means for preventing movement of said slider from said locked position.

10. A valve according to claim 9 wherein said valve is a quarter turn valve.

11. A valve according to claim 10 wherein said quarter turn valve is a ball valve.

12. A valve according to claim 9 wherein said locking means includes the intermediate portion of said handle having an aperture located adjacent said slider member when said slider member is in said locked position for receiving a locking member which is engaged by said slider member when movement away from said locking position is attempted.

13. A valve according to claim 12 wherein said aperture is sized to receive a shackle of a padlock which serves as said locking member.

14. A valve according to claim 8 wherein the intermediate portion of said handle is inclined outwardly relative to said body in a direction away from said boss.

15. A valve according to claim 8 wherein the inner end portion of said handle includes a finger extending inwardly toward said body; and said stop means comprises a pair of circumferentially spaced projections formed as an integral part of said boss and having surfaces at locations corresponding to said open and closed position which are engaged by said finger to limit rotational movement of said valve member.

16. A valve according to claim 15 wherein said lugs are formed as an integral part of said boss.

* * * * *